United States Patent
Murakami

(10) Patent No.: US 11,347,391 B2
(45) Date of Patent: May 31, 2022

(54) PROPORTION DISPLAY APPARATUS, PROPORTION DISPLAY METHOD, AND RECORDING MEDIUM

(71) Applicant: CASIO COMPUTER CO., LTD., Tokyo (JP)

(72) Inventor: Kouichi Murakami, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/783,743

(22) Filed: Feb. 6, 2020

(65) Prior Publication Data

US 2020/0257444 A1 Aug. 13, 2020

(30) Foreign Application Priority Data

Feb. 7, 2019 (JP) .............................. JP2019-020321

(51) Int. Cl.
| | |
|---|---|
| *G06F 3/0484* | (2022.01) |
| *G06F 3/0488* | (2022.01) |
| *G06F 3/0486* | (2013.01) |
| *G06F 3/0481* | (2022.01) |
| *G06F 3/048* | (2013.01) |

(Continued)

(52) U.S. Cl.
CPC ........ *G06F 3/04883* (2013.01); *G06F 3/0484* (2013.01); *G06F 3/04847* (2013.01); *G06Q 10/06* (2013.01); *G06Q 10/0631* (2013.01); *G06Q 10/0633* (2013.01); *G06Q 10/06311* (2013.01); *G06Q 10/06312* (2013.01); *G06Q 10/06313* (2013.01); *G06Q 10/06316* (2013.01);

(Continued)

(58) Field of Classification Search
CPC .. G06T 11/206; G06F 3/0484; G06F 3/04847; G06Q 10/06; G06Q 10/0631; G06Q 10/06312; G06Q 10/06313; G06Q 10/06316; G06Q 10/0633; G06Q 10/109
See application file for complete search history.

(56) References Cited

U.S. PATENT DOCUMENTS 9,542,063 B1 * 1/2017 Marchant ................ G06F 11/00
2012/0011458 A1 * 1/2012 Xia ..................... G06F 3/04847
715/771

(Continued)

FOREIGN PATENT DOCUMENTS

| JP | 2002-197242 A | 7/2002 |
|---|---|---|
| JP | 2008-112427 A | 5/2008 |
| JP | 2011-197873 A | 10/2011 |

OTHER PUBLICATIONS

JPO; Application No. 2019-020321; Notice of Reasons for Refusal dated Jan. 5, 2021.

*Primary Examiner* — Jin Cheng Wang
(74) *Attorney, Agent, or Firm* — Fitch, Even, Tabin & Flannery LLP

(57) ABSTRACT

Provided is a proportion display apparatus including a processor that performs a display control process to display, on a display, a predetermined graph that is divided into areas of respective items by a boundary line so as to indicate a quantitative proportion of each of the items; and a change process to change a position of the boundary line in response to a user operation. After the position of the boundary line is changed in the change process, the proportion before and after the change process is shown on the predetermined graph in the display control process.

7 Claims, 7 Drawing Sheets

(51) Int. Cl.
  *G06F 9/451* (2018.01)
  *G06F 3/04883* (2022.01)
  *G06Q 10/06* (2012.01)
  *G06Q 10/10* (2012.01)
  *G06F 3/04847* (2022.01)
  *G06T 11/20* (2006.01)

(52) U.S. Cl.
  CPC .......... *G06Q 10/109* (2013.01); *G06T 11/206* (2013.01); *G06F 2203/04806* (2013.01)

(56) References Cited

U.S. PATENT DOCUMENTS

| | | | |
|---|---|---|---|
| 2013/0104071 A1* | 4/2013 | Boutoussov | G06F 3/0481 715/781 |
| 2013/0317840 A1* | 11/2013 | Creswell | G06Q 50/22 705/2 |
| 2014/0282252 A1* | 9/2014 | Edwards | G06F 3/04847 715/833 |
| 2016/0048786 A1* | 2/2016 | Fukuda | G06F 16/26 705/7.23 |
| 2016/0125749 A1* | 5/2016 | Delacroix | G09B 7/00 434/322 |
| 2016/0381411 A1* | 12/2016 | Drake | H04N 21/4532 725/61 |
| 2018/0096036 A1* | 4/2018 | Haldenby | G06F 16/2462 |
| 2018/0329461 A1* | 11/2018 | Hernandez Santisteban | G06F 3/04817 |
| 2019/0039512 A1* | 2/2019 | Taki | B60K 35/00 |
| 2019/0196703 A1* | 6/2019 | Moon | G06F 3/0486 |
| 2019/0228423 A1* | 7/2019 | Russell | G06Q 30/0202 |
| 2020/0272133 A1* | 8/2020 | Yokoi | G05B 19/41865 |

* cited by examiner

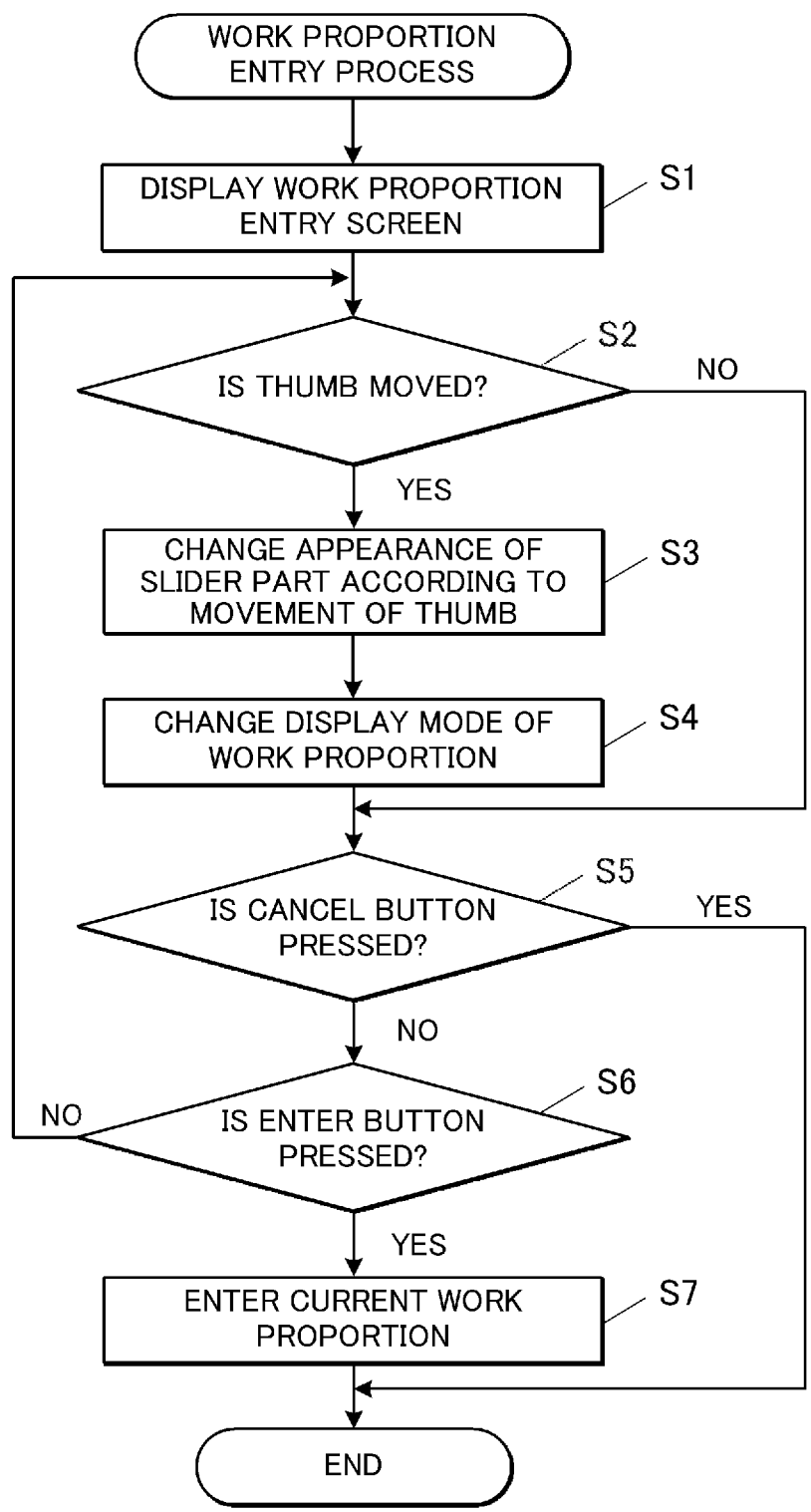

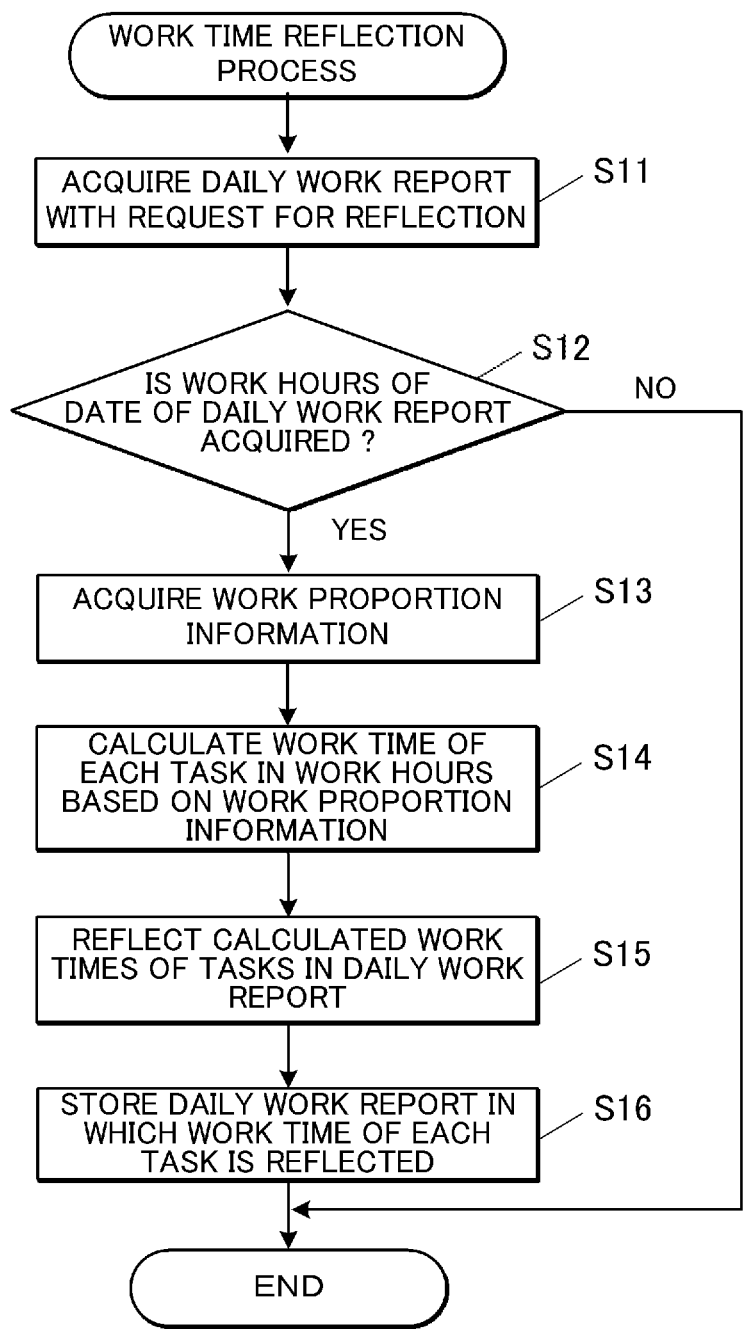

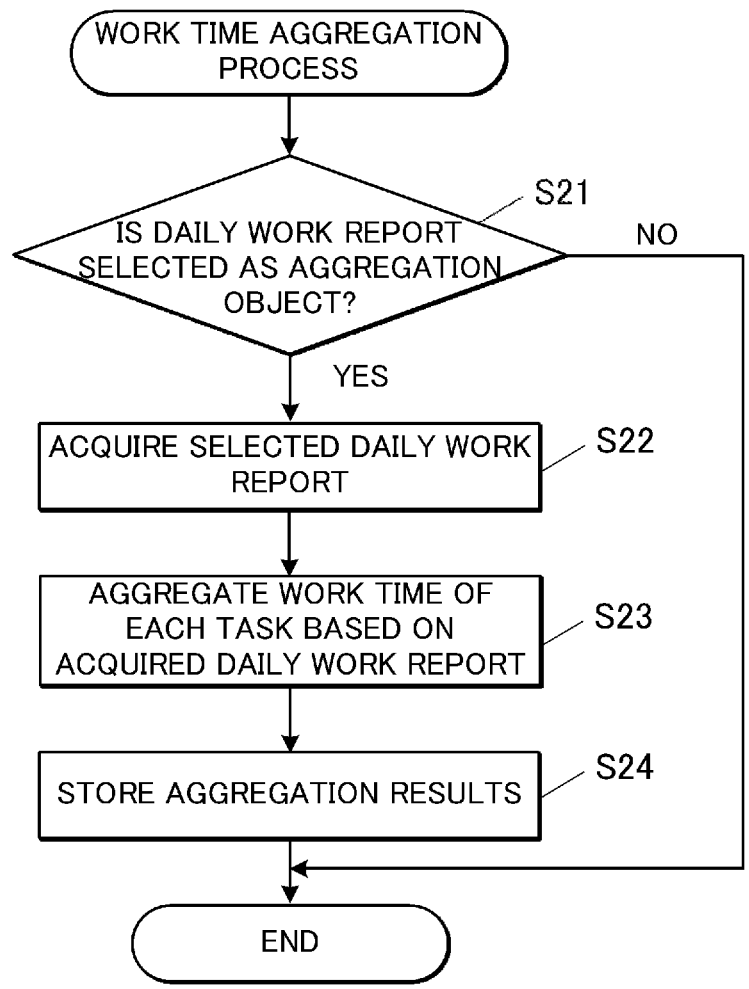
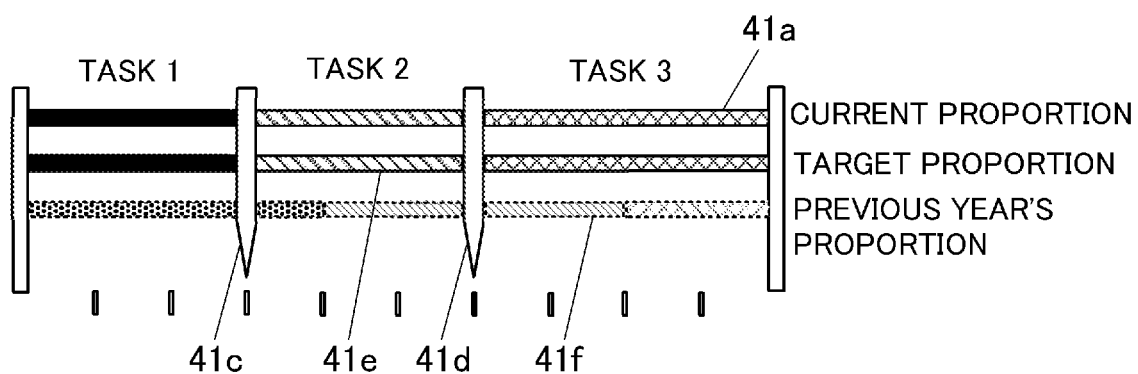

PROPORTION DISPLAY APPARATUS, PROPORTION DISPLAY METHOD, AND RECORDING MEDIUM

CROSS-REFERENCE TO RELATED APPLICATION

This application is based upon and claims the benefit of priority from the prior Japanese Patent Application No. 2019-020321, filed on Feb. 7, 2019, the entire contents of which are incorporated herein by reference.

TECHNICAL FIELD

The present invention relates to a proportion display apparatus, a proportion display method, and a recording medium.

BACKGROUND OF THE INVENTION

Conventionally, there has been proposed a graphic generation server for generating an icon that graphically represents a character string of combination of a pseudonym identifier and a consistent identifier (see, for example, JP 2011-197873 A). The graphic generation server generates the icon based on proportion information indicating the proportion of the pseudonym identifier and the consistent identifier, and the proportion information is generated as the proportion of the pseudonym identifier and the consistent identifier assigned to each side of the slider is input by moving the thumb of the slider on the proportion input screen displayed on the user terminal device.

However, in the proportion input screen disclosed in Patent Document 1, when the proportion is reconsidered after the proportion of the pseudonym identifier and the consistent identifier is temporarily changed by moving the thumb, the initial proportion cannot be referred to, which results in poor usability.

SUMMARY OF THE INVENTION

In order to solve the problems, a proportion display apparatus according to an aspect of the present invention includes a processor that performs:

a display control process to display, on a display, a predetermined graph that is divided into areas of respective items by a boundary line so as to indicate a quantitative proportion of each of the items; and a change process to change a position of the boundary line in response to a user operation;

wherein after the position of the boundary line is changed in the change process, the proportion before and after the change process is shown on the predetermined graph in the display control process.

BRIEF DESCRIPTION OF THE DRAWINGS

FIG. 5 is a flowchart showing control steps of a work proportion entry process.

FIG. 6 is a flowchart showing control steps of a work time reflection process.

FIG. 7 is a flowchart showing control steps of a work time aggregation process.

FIG. 8 shows a variation of a slider part.

DETAILED DESCRIPTION OF THE INVENTION

Hereinafter, specific embodiments of the present invention are described with reference to the drawings. However, the scope of the invention is not limited to the illustrated examples.

<Configuration of Target Management System 1>

Figure 1:
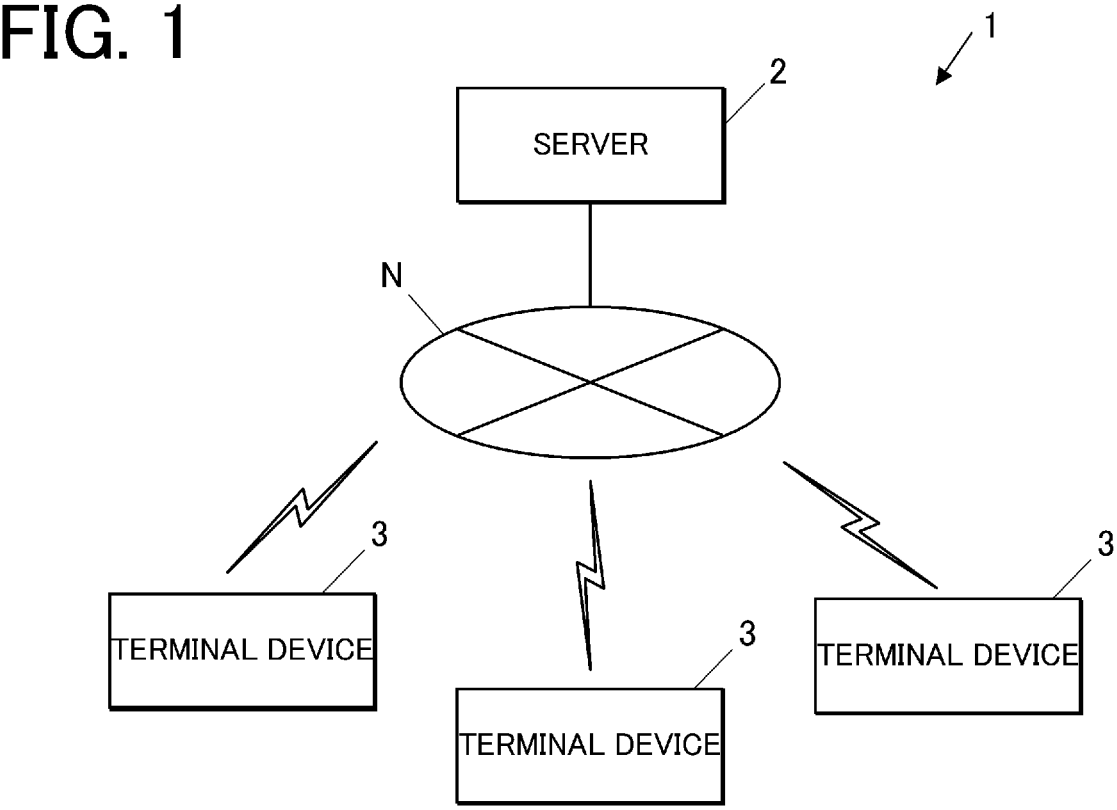
FIG. 1 is a block diagram showing a target management system according to an embodiment of the present invention.

First, the configuration of the present embodiment is described with reference to FIG. 1. FIG. 1 shows a schematic configuration of a target management system 1 of the present embodiment.

The target management system 1 of the present embodiment is a system for aggregating and evaluating the work time spent on each task on the basis of a daily work report input by each person belonging to an organization such as a company, as a part of target management. In the following description, a company composed of a plurality of employees is exemplified as an object of target management by the target management system 1, but the object is not limited thereto, and the target management system 1 can be used for target management of any organization composed of a plurality of persons.

As shown in FIG. 1, the target management system 1 includes a server (proportion display apparatus, information processing apparatus) 2 and a plurality of terminal devices 3. The server 2 and each terminal device 3 are connected via a communication network N so as to communicate with each other.

The server 2 is, for example, a server on a cloud, and provides a Web service for the target management.

The terminal devices 3 are, for example, terminal devices used by employees of a company that has introduced the target management system 1. Each terminal device 3 is, for example, a notebook PC (Personal Computer), a desk top PC, or the like, though the present invention is not limited thereto, and it may be a smartphone, a tablet PC, a mobile phone, or a PDA (Personal Digital Assistant).

The communication network N is, for example, the Internet, but may be another network such as a LAN (Local Area Network).

<Configuration of Server 2>

Figure 2:
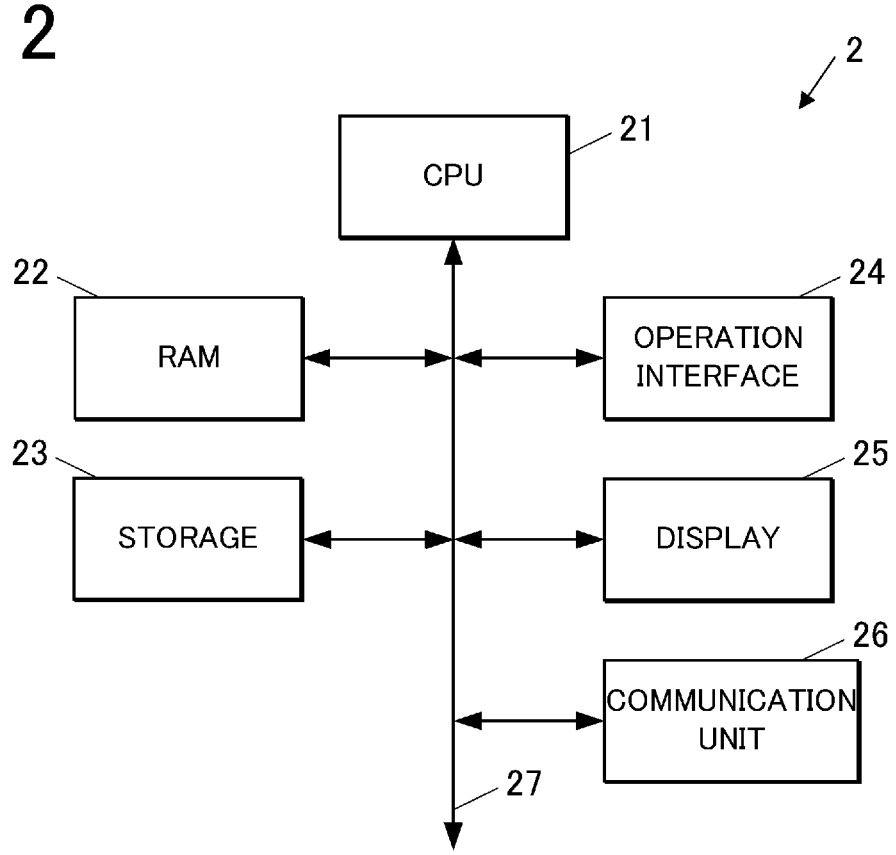
FIG. 2 is a block diagram showing a functional configuration of a server.

Next, a functional configuration of the server 2 is described with reference to FIG. 2. FIG. 2 is a block diagram showing a functional configuration of the server 2.

As shown in FIG. 2, the server 2 includes a CPU (Central Processing Unit) 21, a RAM (Random Access Memory) 22, a storage 23, an operation interface 24, a display 25, and a communication unit 26. The components of the server 2 are connected to each other via a bus 27.

The CPU (display control means, changing means, calculation means, storage control means, reflection means, aggregation means, and setting means) 21 reads out various programs such as a system program and an application program stored in the storage 23, develops them in a work area of the RAM 22, and controls the operations of the components of the servers 2 in accordance with the programs. For example, the CPU 21 executes the application program, generates control signals for causing the display 35 of each terminal device 3 to show a screen concerning the execution results of the application programs, and transmits the control signals to the terminal device 3 via the communication unit 26.

The RAM 22 is, for example, a volatile memory, and has a work area for temporarily storing various programs and data read out by the CPU 21.

The storage (storage means) 23 is configured by, for example, an HDD (Hard Disk Drive), an SSD (Solid State Drive), an EEPROM (Electrically Erasable Programmable Read Only Memory), or the like. In the storage 23, application programs such as a system program and a web server program to be executed by the CPU 21, and data required to execute these programs such as a target management database are stored. The target management database is a data group in which various kinds of information used for target management is accumulated. The target management database may be stored in another file server or the like that is communicably connected via the communication unit 26.

The operation interface 24 includes, for example, a key input unit such as a keyboard and a pointing device such as a mouse. The operation interface 24 receives a key input and a position input, and outputs the operation information to the CPU 21.

The display 25 is, for example, an LCD (Liquid Crystal Display), an organic EL (Electro Luminescence) display, or the like. The display 25 displays various screens according to commands of display signals that are outputted from the CPU 21 and inputted to the display 25.

The communication unit 26 is composed of, for example, a network card or the like. The communication unit 26 is communicably connected to the communication network N and communicates with a device on the communication network N (for example, the terminal devices 3).

<Configuration of Terminal Device 3>

Figure 3:
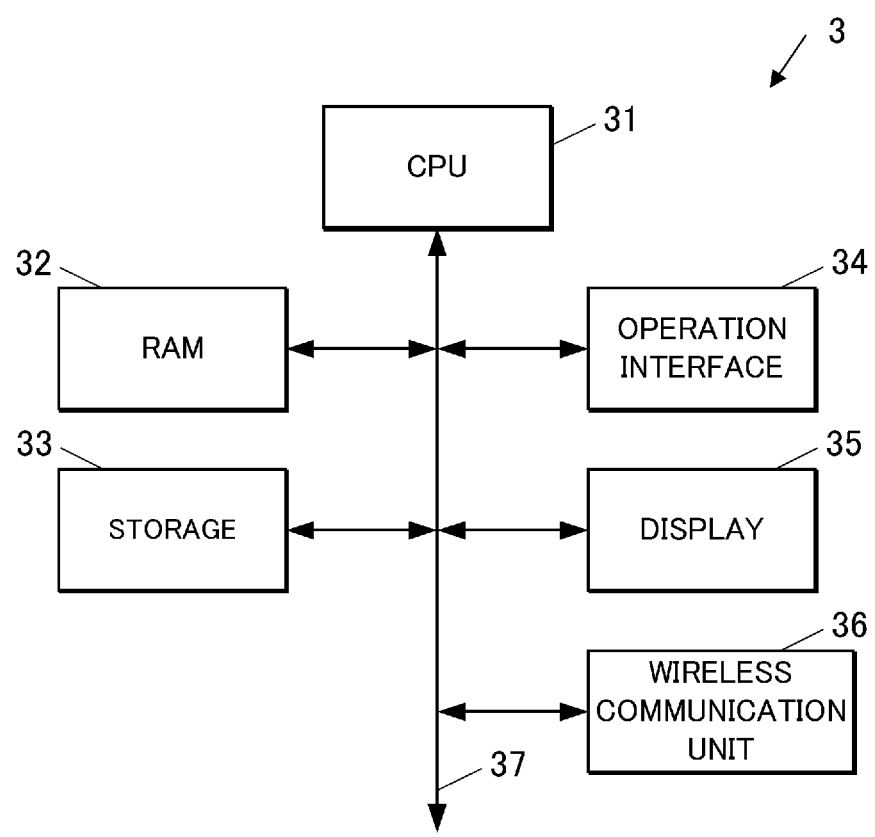
FIG. 3 is a block diagram showing a functional configuration of a terminal device.

Next, a functional configuration of the terminal device 3 is described with reference to FIG. 3. FIG. 3 is a block diagram showing a functional configuration of the terminal device 3.

As shown in FIG. 3, each of the terminal devices 3 includes a CPU 31, a RAM 32, a storage 33, an operation interface 34, a display 35, and a wireless communication unit 36. The components of the terminal device 3 are connected to each other via a bus 37.

The CPU 31 reads out various programs such as a system program and an application program stored in the storage 33, develops them in a work area of the RAM 32, and controls the operation of each component of the terminal device 3 in accordance with the programs. For example, the CPU 31 executes a program for information display and input such as a browser, and causes the wireless communication unit 36 to transmit information, to the server 2, based on a user operation input on the operation interface 34, or causes the display 35 to display information received from the server 2.

The RAM 32 is, for example, a volatile memory, and has a work area for temporarily storing various programs and data read out by the CPU 31.

The storage 33 includes, for example, an HDD, an SSD, an EEPROM, a flash memory, and the like. In the storage 33, a system program and application programs such as a browser to be executed by the CPU 31, data required to execute these programs, and the like are stored.

The operation interface 34 includes, for example, a key input unit such as a keyboard and a pointing device such as a mouse. The operation interface 34 receives a key input and a position input, and outputs the operation information to the CPU 31.

The display 35 is, for example, an LCD, an organic EL display, or the like. The display 35 displays various screens according to commands of inputted display signals outputted from the CPU 31.

The wireless communication unit 36 includes, for example, an antenna, a modulation/demodulation circuit, a signal processing circuit, and the like. The wireless communication unit 36 transmits and receives information to and from a base station, an access point, or the like connected to the communication network N through wireless radio waves, so as to perform communication with a device on the communication network N (for example, the server 2).

<Operation of Target Management System 1>

In the target management system 1 of the present embodiment, as the work proportion of a plurality of tasks done in work hours is input. Then, the system can calculate the work times spent on the respective tasks from the input work proportion and the work hours, and reflect the work times in the daily work report, for example, without requiring the work times spent on the plurality of tasks to be input at the time of creating the daily work report.

Hereinafter, a work proportion entry screen displayed on the display 35 of the terminal device 3 at the time of inputting the above-mentioned work proportion is described.

Figure 4A:
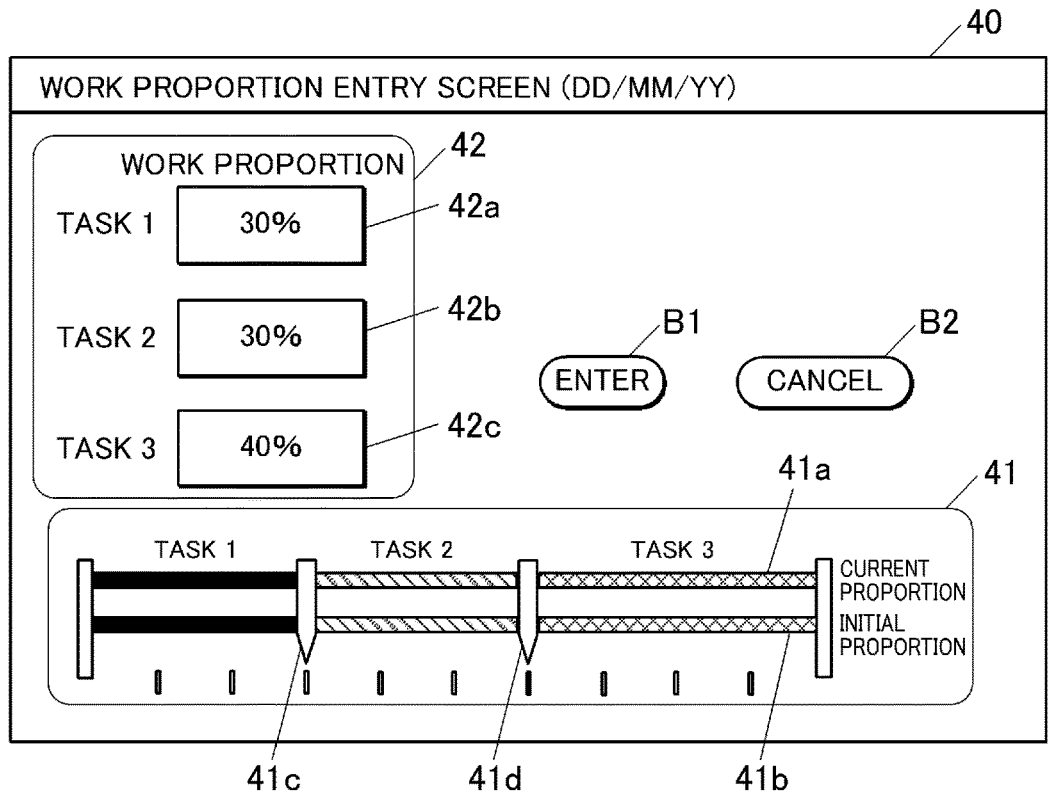
FIG. 4A shows a work proportion entry screen before the work proportion is changed.
Figure 4B:
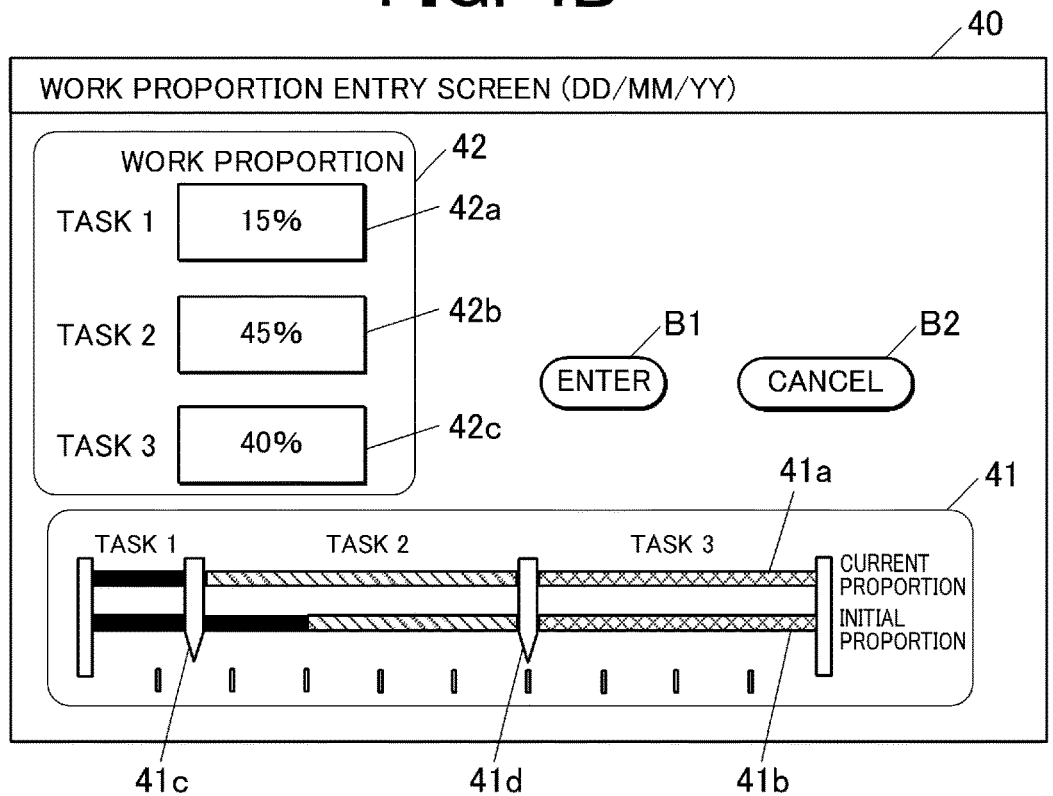
FIG. 4B shows a work proportion entry screen after the work proportion has been changed.

FIGS. 4A and 4B show a work proportion entry screen 40. Specifically, FIG. 4A shows the work proportion entry screen 40 before the work proportion is changed, and FIG. 4B shows the work proportion entry screen 40 after the work proportion has been changed.

As shown in FIGS. 4A and 4B, a slider part 41, a work proportion display area 42, an enter button B1, and a cancel button B2 are displayed on the work proportion entry screen 40.

In the slider part 41, a first bar graph (predetermined graph) 41a, a second bar graph (predetermined graph) 41b, a first thumb 41c, and a second thumb 41d are displayed.

The first bar graph 41a shows the current proportion of the work times spent on Tasks 1 to 3. On the other hand, the second bar graph 41b shows the initial proportion of the work times spent on Tasks 1 to 3. The first bar graph 41a and the second bar graph 41b are divided into areas of Tasks 1 to 3 by boundary lines, thereby indicating the proportion of the work times spent on Tasks 1 to 3. The first bar graph 41a and the second bar graph 41b are shown in the same length, and below the second bar graph 41b, nine tick marks are shown at equal intervals in increments of 10% between the left and right ends of the second bar graph 41b. Accordingly, in the first bar graph 41a and the second bar graph 41b, the sum of the proportions of the work times of Tasks 1 to 3 is 100%.

The first thumb (changing means) 41c is used for changing the position of a boundary line that separates the area of Task 1 (solid black area in the drawings) and the area of Task 2 (area hatched in the drawings) in the first bar graph 41a. The first thumb 41c can be moved in the left-right direction on the first bar graph 41a and the second bar graph 41b via the operation interface 34 of the terminal device 3. The second thumb (changing means) 41d is used for changing the position of a boundary line that separates the area of Task 2 (area hatched in the drawings) and the area of Task 3 (area cross-hatched in the drawings) in the first bar graph 41a. Like the first thumb 41c, the second thumb 41d can be moved in the left-right direction on the first bar graph 41*a* and the second bar graph 41*b* via the operation interface 34 of the terminal device 3.

For example, as shown in FIG. 4A, in a state where the slider part 41 is displayed on the display 35 before the proportion of the work time of Tasks 1 to 3 is changed, when the employee moves the first thumb 41*c* leftward by one and a half steps, as shown in FIG. 4B, the proportion of the work time of Task 1 is changed from 30% to 15% in the first bar graph 41*a*, and the proportion of the work time of Task 2 is changed from 30% to 45%. On the other hand, in the second bar graph 41*b*, the initial proportion of the work time of Tasks 1 to 3 are continuously shown as described above without being changed by the movement of the first thumb 41*c*. Therefore, when the employee moves the first thumb 41*c* or the second thumb 41*d*, the initial proportion of the work time of Tasks 1 to 3 is continuously shown in the second bar graph 41*b*, so that he/she can change the proportion of the work time of Tasks 1 to 3 while referring to the initial proportion.

The work proportion display area 42 shows numerical values of the proportion of the work time of Tasks 1 to 3 represented in the first bar graph 41*a*. More specifically, the work proportion display area 42 includes a first display area 42*a* for showing the proportion of the work time of Task 1 as a numerical value, a second display area 42*b* for showing the proportion of the work time of Task 2 in a numerical value, and a third display area 42*c* for showing the proportion of the work time of Task 3 in a numerical value.

For example, as shown in FIG. 4A, in a state where the slider part 41 before the proportion of the work time of Tasks 1 to 3 is changed is displayed on the display 35, "30%" is shown as the proportion of the work time of Task 1, "30%" is shown as the proportion of the work time of Task 2, and "40%" is shown as the proportion of the work time of Task 3 respectively in the first display area 42*a*, the second display area 42*b*, and the third display area 42*c*.

On the other hand, as shown in FIG. 4B, in a state where the slider part 41 after the proportion of the work time of Tasks 1 to 3 has been changed is displayed on the display 35, "15%" is shown as the proportion of the work time of Task 1, "45%" is shown as the proportion of the work time of Task 2, and "40%" is shown as the proportion of the work time of Task 3 respectively in the first display area 42*a*, the second display area 42*b*, and the third display area 42*c*.

The enter button B1 is used for storing the proportion information, which indicates the proportion of the work time of Tasks 1 to 3 displayed on the display 35, in the target management database of the storage 23 of the server 2.

For example, as shown in FIG. 4A, when the enter button B1 is pressed by the employee in a state before the proportion of the work time of Tasks 1 to 3 is changed, the proportion of the work time of Task 1 is set to 30%, the proportion of the work time of Task 2 is set to 30%, and the proportion of the work time of Task 3 is set to 40%, and the proportion information indicating the proportion is stored in the target management database. On the other hand, as shown in FIG. 4B, in a state after the proportion of the work time of Tasks 1 to 3 has been changed, when the enter button B1 is pressed by the employee, the proportion of the work time of Task 1 is set to 15%, the proportion of the work time of Task 2 is set to 45%, and the proportion of the work time of Task 3 is set to 40%, and the proportion information indicating the proportion is stored in the target management database.

The cancel button B2 is used for cancelling entry of the work proportion. When the cancel button B2 is pressed by the employee, the work proportion entry screen 40 displayed on the display 35 is switched to another screen.

[Work Proportion Entry Process]

Next, the control steps of the work proportion entry process in the server 2 are described. The work proportion entry process is executed when a work proportion enter button (not shown) is pressed in a state where a daily work report creation screen (not shown) for inputting the work time or the like of each task done in the work hours of the day is displayed on the display 35 of the terminal device 3, for example. Such daily work reports are usually created after the work hours of the day.

FIG. 5 is a flowchart showing the control steps of the work proportion entry process.

When the work proportion entry process is started, the CPU 21 of the server 2 displays the work proportion entry screen 40 (see FIG. 4A) on the display 35 of the terminal device 3 (Step S1).

Next, the CPU 21 determines whether or not the thumb (the first thumb 41*c* and/or the second thumb 41*d*) has been moved via the operation interface 34 of the terminal device 3 (Step S2). That is, the CPU 21 executes a change process.

If it is determined at Step S2 that the thumb has not been moved (Step S2; NO), the CPU 21 skips Steps S3 and S4 and proceeds to Step S5.

If it is determined at Step S2 that the thumb has been moved (Step S2; YES), the CPU 21 changes the appearance the slider part 41 in accordance with the movement of the thumb (Step S3). Then, the CPU 21 changes the appearance of the work proportion display area 42 in accordance with the movement of the thumb (Step S4). That is, the CPU 21 executes a display control process and a setting process.

The CPU 21 determines whether or not the cancel button B2 has been pressed via the operation interface 34 of the terminal device 3 (Step S5).

If it is determined at Step S5 that the cancel button B2 has been pressed (Step S5; YES), the CPU 21 ends the work proportion entry process.

If it is determined at Step S5 that the cancel button B2 has not been pressed (Step S5; NO), the CPU 21 determines whether or not the enter button B1 has been pressed via the operation interface 34 of the terminal device 3 (Step S6).

If it is determined at Step S6 that the enter button B1 has not been pressed (Step S6; NO), the CPU 21 returns to Step S2 and repeats the subsequent steps.

If it is determined at Step S6 that the enter button B1 has been pressed (Step S6; YES), the CPU 21 enters (stores) in the target management database in the storage 23 the proportion information indicating the current work proportion (the proportion of the work time of Tasks 1 to 3) displayed on the display 35 (step S7), and ends the work proportion entry process. Here, when creation of the daily work report on the above-mentioned daily work report creation screen is completed (it is assumed that the work time of each task is not input) after the current work proportion is entered and the work proportion entry process is completed, the daily work report is entered in the target management database of the storage 23 as a daily work report with a request for reflection of the work time spent on each task, in which the proportion information indicating the current work proportion and the daily work report are associated with each other. That is, the CPU 21 executes a storing control process.

[Work Time Reflection Process]

Next, the control steps of the work time reflection process in the server 2 are described.

FIG. 6 is a flowchart showing the control steps of the work time reflection process.

When the work time reflection process is started, the CPU 21 of the server 2 acquires the daily work report with a request for reflection from the target management database of the storage 23 (Step S11). Here, the daily work report with a request for reflection means the daily work report which is associated with the proportion information indicating the current work proportion as described above.

Next, the CPU 21 determines whether or not the work hours on the date of the daily work report acquired at Step S11 (the work hours of the employee who created the daily work report) has been confirmed (Step S12).

If it is determined at Step S12 that the work hours has not been confirmed (Step S12; NO), the CPU 21 ends the work time reflection process.

If it is determined at Step S12 that the work hours has been confirmed (Step S12; YES), the CPU 21 acquires the proportion information entered in advance by the employee who created the daily work report acquired at Step S11 from the target management database of the storage 23 (Step S13).

Next, the CPU 21 calculates the work time of each task in the work hours of the day based on the work proportion of each task indicated by the proportion information (Step S14). For example, when the work proportion of Task 1, Task 2, and Task 3 is 3:9:8 and the work hours are 8 hours, the work times of Tasks 1 to 3 are calculated to be 1.2 hours, 3.6 hours, and 3.2 hours, respectively. That is, the CPU 21 executes a calculation process.

Next, the CPU 21 reflects the work time of each task calculated at Step S14 in the daily work report acquired at Step S11 (Step S15). That is, the CPU 21 executes a reflection process Next, the CPU 21 stores in the target management database of the storage 23 the daily work report in which the work time of each task is reflected at Step S15 (Step S16), and ends the work time reflection process.

[Work Time Aggregation Process]

Next, the control steps of the work time aggregation process in the server 2 are described.

FIG. 7 is a flowchart showing the control steps of the work time aggregation process.

If the work time aggregation process is started, the CPU 21 of the server 2 determines whether or not daily work reports to be aggregated have been selected via the operation interface 34 of the terminal device 3 (Step S21).

If it is determined at Step S21 that the daily work reports to be aggregated have not been selected (Step S21; NO), the CPU 21 ends the work time aggregation process.

If it is determined at Step S21 that the daily work reports to be aggregated have been selected (Step S21; YES), the CPU 21 acquires the selected daily work reports from the target management database of the storage 23 (Step S22).

Next, the CPU 21 aggregates the work time with respect to each task from the daily work reports acquired at Step S22 (Step S23). For example, in the case where there are three types of tasks, Task 1 to Task 3, the work time is aggregated with respect to each of Tasks 1 to 3. That is, the CPU 21 executes an aggregation process.

Next, the CPU 21 stores the aggregation result in the target management database of the storage 23 (Step S24), and ends the work time aggregation process.

As described above, according to the present embodiment, the server 2 in the target management system 1 causes the display 35 of the terminal device 3 to display the first bar graph 41a and the second bar graph 41b that are divided into the area of each item (Task 1 to Task 3) by the boundary lines to indicate the proportion of the amount (work time) of each item (Task 1 to Task 3), allows the position of the boundary lines to be changed according to the user operation, and when the position of the boundary lines is changed, and displays the proportions (work proportions) before and after the change, respectively in the first bar graph 41a and the second bar graph 41b.

Therefore, when the employee changes the work proportion of Tasks 1 to 3 in the first bar graph 41a, the server 2 allows him/her to change the work proportion while referring to the initial work proportion of Tasks 1 to 3 shown in the second bar graph 41b, so that he/she can change the work proportion while intuitively checking how much the difference is between the current proportion and the initial proportion. This facilitates input of the work proportion.

The server 2 causes the terminal devices 3 to display the first bar graph 41a and the second bar graph 41b next to each other. This makes it easy to check how much difference is between the current values and the initials value of the work proportion of Tasks 1 to 3.

Further, the server 2 calculates the work times of Tasks 1 to 3 in the work hours based on the work proportion of Tasks 1 to 3. When the position of the boundary lines of the first bar graph 41a is changed, the server 2 calculates the work time of Tasks 1 to 3 in the work hours based on the changed work proportion of Tasks 1 to 3.

Therefore, since the server 2 can calculate the work times of Tasks 1 to 3 in the work hours according to the work proportion of Tasks 1 to 3 and thereby save the employee's time to input the work time of each task.

Further, when the position of the boundary lines of the first bar graph 41a is changed, the server 2 stores the proportion information indicating the changed work proportion of Tasks 1 to 3 in the target management database of the storage 23, and can calculate the work times of Tasks 1 to 3 in the work hours according to the work proportion indicated by the proportion information.

Therefore, the server 2 can calculate the work time of each of Tasks 1 to 3 in the work hours by using the proportion information stored in the target management database of the storage 23, and thereby greatly save employee's time to input the work time of each task.

Further, the server 2 reflects the calculated work times of Tasks 1 to 3 in the daily work report. Therefore, the server 2 can save employee's time to input the work time of each task when he/she creates the daily work report.

In addition, the server 2 aggregates the calculated work times of Tasks 1 to 3 for each. Therefore, the server 2 allows evaluation of each of Tasks 1 to 3 based on the result of the aggregation.

In the above description, the HDD, SSD, or EEPROM of the storage 23 is used as a computer-readable medium of the programs according to the present invention as an example, but the present invention is not limited thereto. Other computer-readable media, such as a flash memory, a portable recording medium, and a CD-ROM can be used. A carrier wave is also applicable to the present invention as a medium for providing the data relating to the program according to the present invention via a communication line.

The description in the above embodiment is an example of a proportion display apparatus, a proportion display method, and a recording medium according to the present invention, and is not intended to limit the present invention.

In the above embodiment, as shown in FIGS. 4A and 4B, the current proportion of the work times of Tasks 1 to 3 is shown in the first bar graph 41a, and the initial proportion of the work times of Tasks 1 to 3 is shown in the second bar graph 41b, but, for example, an existing bar graph may be changed to another bar graph, or another bar graph may be newly added according to a user operation. Specifically, as shown in FIG. 8, the second bar graph 41b may be changed to the third bar graph 41e so that the target proportion of the work times of Tasks 1 to 3 is shown in the third bar graph 41e. Further, a fourth bar graph 41f may be added so that the previous year's proportion of work times of Tasks 1 to 3 is shown in the fourth bar graph 41f.

Further, in the above embodiment, the work proportion of Tasks 1 to 3 is set in the work proportion entry process, but, when the work time to be spent on Task 1 is invariable (for example, when the work time of Task 1 is fixed at 1 hour), the work time of Task 1 may be automatically set as it is while the work proportion of Tasks 2 and 3 may be set by an employee.

Further, in the above embodiment, the proportion information indicating one work proportion is stored in the target management database of the storage 23 in the work proportion entry process, but the proportion information indicating a plurality of work proportions may be stored, for example. When the daily work report is created by an employee, the employee may select an appropriate work proportion so that the work times of Tasks 1 to 3 calculated based on the selected work proportion indicated by the proportion information is reflected in the daily work report.

Further, in the above embodiment, the work proportion of Tasks 1 to 3 is set by using the slider part 41, but the slider part 41 can be used to input the proportion concerning other items. For example, the distribution proportion of a plurality of types of employees may be set by using the slider part 41. In this case, for example, every time a new department is established, the number of employees of each type to be assigned can be calculated based on the capacity of the department and the said distribution proportion.

Figure 9:
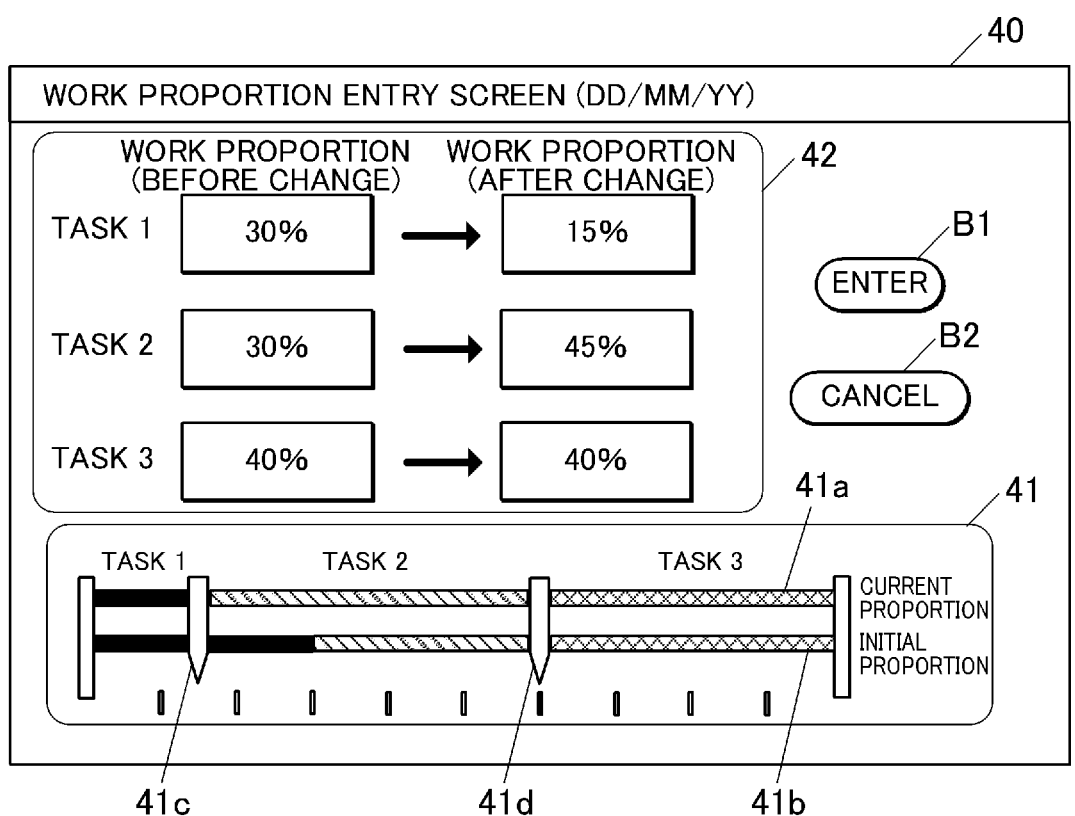
FIG. 9 shows a variation of a work proportion display area.

In the above embodiment, as shown in FIG. 9, when the work proportion of Tasks 1 to 3 is changed, the work proportion before the change and the work proportion after the change may also be displayed on the work proportion display area 42 of the work proportion entry screen 40.

Further, in the above embodiment, the work proportion of Tasks 1 to 3 is shown by the bar graphs, but the illustration is not limited to a bar graph as long as the work proportion can be understood. For example, the work proportion of Tasks 1 to 3 may be shown by a pie graph.

It is needless to say that the detailed configuration and particular operations of the components of the target management system 1 in the above embodiment can be appropriately modified without departing from the scope of the present invention.

Although some embodiments of the present invention have been described, the scope of the present invention is not limited to the above embodiments and includes the scope of the invention described in the claims and the scope equivalent thereto.

The invention claimed is:

1. A proportion display apparatus comprising at least one processor that performs:
    a first display control process to display, on a display, a pair of bar graphs that are each divided into areas of respective items so as to indicate a quantitative proportion of each of the items;
        wherein the pair of the bar graphs includes a first bar graph and a second bar graph,
        wherein the first bar graph indicates the proportion before change and the second bar graph indicates the proportion after the change, and
    a second display control process to display a slider thumb that is in a form visible as a boundary line to divide the pair of the bar graphs into the areas and that overlaps both of the pair of the bar graphs at least partially;
        wherein the proportion is changed by a user operation of the thumb to move in an extending direction of the pair of the bar graphs,
    wherein the at least one processor displays, in the first display control process, the pair of the bar graphs by showing neighboring areas in modes different from each other so that division of the areas is visible by a difference in the modes,
    wherein in response to the user operation of the thumb for changing the proportion, the at least one processor reflects the change in the division of the areas shown by the difference in the modes on only the second bar graph of the pair of the bar graphs,
    wherein the at least one processor displays, in the first display control process, the pair of the bar graphs such that the first bar graph and the second bar graph are separate from each other at a first distance,
    wherein in the second display control process, the slider thumb is longer than the first distance and overlaps both of the first bar graph and the second bar graph at least partially.

2. The proportion display apparatus according to claim 1, wherein in the first display control process, the at least one processor displays a tick mark along with the pair of the bar graphs,
    wherein in the second display control process, the at least one processor displays the thumb of the slider pointing at the tick mark.

3. The proportion display apparatus according to claim 1, wherein the at least one processor performs a third display control process to display a value of the proportion corresponding to the second bar graph of the pair of the bar graphs.

4. The proportion display apparatus according to claim 1, wherein in the first display control process, the at least one processor displays the pair of the bar graphs such that the areas of the items in the first bar graph and the areas of the corresponding items in the second bar graph are displayed in a same manner.

5. The proportion display apparatus according to claim 1, wherein the at least one processor performs a fourth display control process to display a name of each of the items such that a position of the name is changed according to the change of the division in the second bar graph.

6. A proportion display method comprises:
    displaying, on a display, a pair of bar graphs that are each divided into areas of respective items so as to indicate a quantitative proportion of each of the items;
        wherein the pair of the bar graphs includes a first bar graph and a second bar graph,
        wherein the first bar graph indicates the proportion before change and the second bar graph indicates the proportion after the change, and
    displaying a slider thumb that is in a form visible as a boundary line to divide the pair of the bar graphs into the areas and that overlaps both of the pair of the bar graphs at least partially;
        wherein the proportion is changed by a user operation of the thumb to move in an extending direction of the pair of the bar graphs, wherein the pair of the bar graphs are displayed by showing neighboring areas in modes different from each other so that division of the areas is visible by a difference in the modes, wherein in response to the user operation of the thumb for changing the proportion, the change in the division of the areas shown by the difference in the modes is reflected on only the second bar graph of the pair of the bar graphs, wherein the pair of the bar graphs are displayed such that the first bar graph and the second bar graph are separated from each other at a first distance, wherein the slider thumb is longer than the first distance and overlaps with both the first bar graph and the second bar graph at least partially.

7. A non-transitory computer-readable medium in which a program executed by a processor of a proportion display apparatus is stored, the program causing the processor to perform:

a first display control process to display, on a display, a pair of bar graphs that are each divided into areas of respective items so as to indicate a quantitative proportion of each of the items;

wherein the pair of the bar graphs includes a first bar graph and a second bar graph, wherein the first bar graph indicates the proportion before change and the second bar graph indicates the proportion after the change, and a second display control process to display a slider thumb that is in a form visible as a boundary line to divide the pair of the bar graphs into the areas and that overlaps both of the pair of the bar graphs at least partially;

wherein the proportion is changed by a user operation of the thumb to move in an extending direction of the pair of the bar graphs, wherein in the first display control process, the pair of the bar graphs are displayed by showing neighboring areas in modes different from each other so that division of the areas is visible by a difference in the modes, wherein in response to the user operation of the thumb for changing the proportion, the change in the division of the areas shown by the difference in the modes is reflected on only the second bar graph of the pair of the bar graphs, wherein in the first display control process, the pair of the bar graphs are displayed such that the first bar graph and the second bar graph are separate from each other at a first distance, wherein in the second display control process, the slider thumb is longer than the first distance and overlaps both of the first bar graph and the second bar graph at least partially.

* * * * *